Sept. 3, 1935.  J. J. DRUMM ET AL  2,013,379
STORAGE BATTERY
Filed Dec. 8, 1932
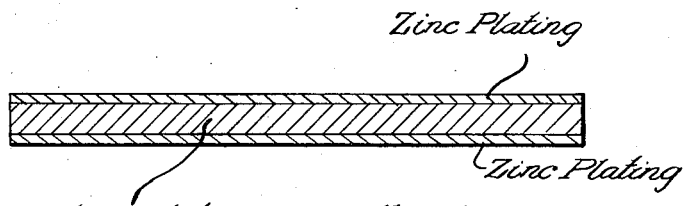
Zinc Plating
Zinc Plating
Supporting plate of iron alloyed with nickel or cobalt with or without auxiliary metals Cr, Mo, W, Mg, Zn, Cd, Ag, Mn, V, Ta.
INVENTORS:
J. J. Drumm, T. Hagyard & R. H. D. Barklie
BY: Marks & Clerk
ATTORNEYS.

Patented Sept. 3, 1935

2,013,379

UNITED STATES PATENT OFFICE 2,013,379

STORAGE BATTERY

James Joseph Drumm, Thomas Hagyard, and Robert Henry Douglas Barklie, Dublin, Irish Free State, assignor to Drumm Battery Company, Limited, Dublin, Ireland Application December 8, 1932, Serial No. 646,280
In Great Britain December 9, 1931

5 Claims. (Cl. 136—31)

This invention relates to secondary or storage batteries or electric accumulators with particular reference to those employing an alkaline electrolyte and is an improvement in or modification of the invention claimed in British Specification No. 365,125.

The present invention relates particularly to the surface for the support of the zinc plated out of the electrolyte and to special means adopted for the preparation of this surface having any or all of the following properties:—

(1) By cathodic treatment in an aqueous caustic alkaline solution, for example caustic potash, in which zinc oxide is dissolved, the electrode or negative plate should readily and quickly receive a satisfactory smooth and adherent deposit of zinc with the minimum of local action. Such a deposition of zinc would correspond with the charging of zinc accumulators of this type.

(2) These properties of the supporting surface for the plating out of zinc on charge of the accumulator should be retained when the accumulator is discharged to such an extent that all the zinc deposit is removed from the underlying supporting surface and the latter becomes subjected to anodic treatment for long or short periods of time. The latter state of affairs would represent the conditions set up in a battery of such zinc cells when individual cells fall out of step with the others and register reverse voltage on discharge.

The invention is clearly illustrated in the accompanying drawing in which the figure is a longitudinal sectional view of a battery plate.

According to the present invention the electrode or negative plate of the secondary battery or accumulator consists basically of nickel or cobalt alloyed with iron, the alloy being used alone or if desired being suitably alloyed with any one or more of the following metals:—chromium, molybdenum, tungsten, magnesium, zinc, cadmium, silver, manganese, vanadium, tantalum. The alloying may be accomplished by the usual methods involving melting, casting, etc., before the fabrication of the electrodes or by methods based on the process of heating, preferably in a reducing atmosphere, the material on which a deposit of the desired metal or metals has been obtained by methods of electrodeposition, hot dipping, spraying, contact with metallic vapours, or by a process of heating in contact with substances containing the metal. Any of these methods may be followed, when desirable, by a treatment at a raised temperature in a reducing atmosphere.

Example 1

A suitable electrode material consists of nickel alloyed with iron as in the material known under the registered trade-mark "Invar" or "Platinite", which contain respectively about 38% and 46% of nickel. Thus "Invar" contains 38 per cent. nickel and 62 per cent. iron, while "Platinite" containes 46 per cent. nickel, 0.15 per cent. carbon and the balance iron. The electrode or negative plate may consist of gauze, corrugated sheet, wire or expanded metal as mentioned in the parent specification. In preparing the negative electrode of the above materials, the metal surface, where necessary, should be descaled by properly pickling or dipping in acids. It will be found that the results obtained with the above materials vary somewhat, other things being equal, according to whether the material has been work hardened or annealed by heating in a reducing atmosphere. Whether the material is used in the form of gauze or wire it is preferable to slightly work harden the wire before using in the actual accumulator.

Example 2

An alloy of iron, nickel and chromium of the type of "Staybrite", "Anka", the materials known under the registered trade-marks "Permawite" and "Dullray".

"Staybrite" consists of approximately 18 per cent. chromium, 8 per cent. nickel, a small percentage of tungsten, and the balance iron. "Anka" consists of approximately 15 per cent. chromium, 11 per cent. nickel, 0.15 per cent. carbon and the balance iron, while "Permawite" consists of approximately 15 to 20 per cent. chromium, 7 to 10 per cent. nickel and the balance iron.

All these materials are satisfactory to a high degree, but so far it has been found that the optimum material is an alloy closely similar to "Dullray". This alloy, in a typical example, consists of 34% nickel, 3.7% chromium and approximately 61–62% iron. It is essential, however, that the carbon content must not exceed 0.1% and the silicon must not exceed 0.2%. Manganese as an impurity is permissible up to 1% and copper is permissible up to 0.5%, and traces of any of the other alloying metals hereinbefore referred to may have no harmful effects. In the preparation of this particular ferronichrome it has been found that the material works best in the form of wire. A wire of 17 gauge may be prepared as follows:—the ordinary ingots from manufacture are drawn down to gauge 14. When annealing is necessary this can be carried out by heating the material in air and subsequently removing the scale by pickling in acid. After about 15 gauge the material is packed together and close annealed for several hours at temperatures varying between 600 and 900° C. After this treatment the wire is again descaled by pickling in acid so as to remove completely oxide from the surface and is drawn finally through smooth dies to the required 17 gauge. At this gauge the alloy or wire is pickled at 20° C. in a mixture of 2 parts sulphuric acid to 1 part nitric acid for about 5 to 10 minutes. It is then rinsed in running water, boiled in caustic potash and kept preserved dry until required.

It should be again emphasized that any material, to prove satisfactory in the new accumulator as a supporting surface for zinc deposition, must possess both the properties outlined above. Whilst any of the materials described under Example 1 or 2 are satisfactory, the material consisting of 34% nickel, 3.7% chromium and 61–62% iron, has proved itself the most satisfactory.

Such materials may be used in the form of wire, wire gauze, tape gauze, tape, plain, corrugated or expanded sheet, with or without perforations, with or without a backing or core of another metal.

For example, a suitable alloy having a high electrical resistance is used in the form of two thin sheets, plane or otherwise, enclosing a thicker sheet of more highly conducting metal, for example iron known under the registered trademark "Armco", being attached to the thicker sheet at a number of places by any suitable means such as welding, riveting, etc.

When rolling sheet or drawing wire, or otherwise working metal, especially of the type of "Dullray", annealing at elevated temperatures should preferably be carried out in a non-oxidizing atmosphere or alternatively the periods of annealing in an oxidizing atmosphere should be made as short as possible, as prolonged annealing in an oxidizing atmosphere tends to lower the resistance of the material to corrosion.

Before use as the negative electrode material in an accumulator, the material should, if necessary, be annealed, preferably in a reducing atmosphere, in order to remove undesirable effects due to work-hardening during fabrication. This annealing may or may not be followed by a process of pickling.

We claim:

1. An alkaline storage battery in which the active negative material consists of zinc plated out of the electrolyte onto a supporting plate having a smooth clean surface of an alloy consisting of metal from the group containing nickel and cobalt with 61% to 62% iron.

2. An alkaline storage battery as claimed in claim 1 wherein the alloy in addition comprises as constituent at least one of the following:—chromium, molybdenum, tungsten, magnesium, zinc, cadmium, silver, manganese, vanadium, tantalum.

3. An alkaline storage battery in which the active negative material consists of zinc plated out of the electrolyte onto a supporting plate having a smooth, clean surface of a nickel-iron alloy comprising 38% nickel and the balance iron.

4. An alkaline storage battery in which the active negative material consists of zinc plated out of the electrolyte onto a supporting plate having a smooth, clean surface of an alloy comprising 34% nickel and approximately 61–62% iron with, in addition, about 3.7 per cent. chromium.

5. An alkaline storage battery in which the active negative material consists of zinc plated out of the electrolyte onto a supporting plate having a smooth, clean surface of a nickel-iron alloy comprising 46 per cent. nickel and the balance iron.

JAMES JOSEPH DRUMM.
THOMAS HAGYARD.
ROBERT HENRY DOUGLAS BARKLIE.